(12) United States Patent
Withey et al.

(10) Patent No.: US 11,759,712 B2
(45) Date of Patent: Sep. 19, 2023

(54) DATA STORAGE SYSTEM AND METHOD

(71) Applicant: Sony Interactive Entertainment Inc., Tokyo (JP)

(72) Inventors: Robert Keith John Withey, Biggleswade (GB); Patrick John Connor, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 275 days.

(21) Appl. No.: 17/154,248

(22) Filed: Jan. 21, 2021

(65) Prior Publication Data

US 2021/0236938 A1  Aug. 5, 2021

(30) Foreign Application Priority Data

Jan. 31, 2020 (GB) ...................................... 2001343

(51) Int. Cl.
*G06T 1/60* (2006.01)
*H04N 19/176* (2014.01)
*H04L 9/08* (2006.01)
*A63F 13/655* (2014.01)
*A63F 13/211* (2014.01)
*A63F 13/213* (2014.01)
*A63F 13/26* (2014.01)
*G06F 3/01* (2006.01)
*G06T 5/00* (2006.01)
(Continued)

(52) U.S. Cl.
CPC .......... *A63F 13/655* (2014.09); *A63F 13/211* (2014.09); *A63F 13/213* (2014.09); *A63F 13/26* (2014.09); *G06F 3/012* (2013.01); *G06T 1/60* (2013.01); *G06T 5/006* (2013.01); *G06T 9/00* (2013.01); *G06T 11/40* (2013.01); *A63F 2300/8082* (2013.01); *G06T 2200/24* (2013.01); *G06T 2210/08* (2013.01); *G06T 2210/36* (2013.01)

(58) Field of Classification Search
CPC .... G06F 9/3885; G06F 9/3897; G06F 17/147; H04N 1/00023; H04N 1/6027; H04N 1/62; H04N 19/42; H04N 19/90; G06T 9/00; G11B 7/013
See application file for complete search history.

(56) References Cited

U.S. PATENT DOCUMENTS

2018/0075574 A1  3/2018  Brennan
2018/0247388 A1*  8/2018  Chan ........................ G06T 1/60

FOREIGN PATENT DOCUMENTS

EP  3385848 A1  10/2018
WO  2018156750 A1  8/2018

OTHER PUBLICATIONS

Extended European Search Report for corresponding Application EP21150604.3, 9 pages, dated Jun. 7, 2021.
(Continued)

*Primary Examiner* — Lawrence S Galka
(74) *Attorney, Agent, or Firm* — Matthew B. Dernier, Esq.

(57) ABSTRACT

A method of data storage includes associating delta colour compression DCC metadata with one or more tiles of graphics data, selecting one or more such tiles that are uniform in colour and hence can be accurately represented by the DCC metadata for that tile, and replacing some or all of the graphics data in one or more selected tiles with different data.

13 Claims, 2 Drawing Sheets

(51) Int. Cl.
    *G06T 9/00*      (2006.01)
    *G06T 11/40*     (2006.01)

(56) References Cited

OTHER PUBLICATIONS

Brennan Chris, "Getting the Most of the Delta Color Compression", GPUOpen, https://gpuopen.com/learn/dcc-overview/, 3 pages, Mar. 14, 2016.
Combined Search and Examination Report for corresponding Application GB2001343.9, 6 pages, dated Jul. 30, 2020.

* cited by examiner

DATA STORAGE SYSTEM AND METHOD

BACKGROUND OF THE INVENTION

Field of the Invention

The present invention relates to a data storage system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional entertainment devices such as videogame consoles and other computers have a physical limit on the memory available to them, and also on the memory available to their peripherals; they may also have a physical or practical limit on the bandwidth available to communicate the contents of memory between the entertainment device and any peripheral.

It is therefore desirable to use memory efficiently, to keep within capacity and bandwidth limits.

The present invention seeks to address or mitigate this issue.

SUMMARY OF THE INVENTION

In a first aspect, a method of data storage is provided in claim 1.

In another aspect, a data storage system is provided in claim 9.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A data storage system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
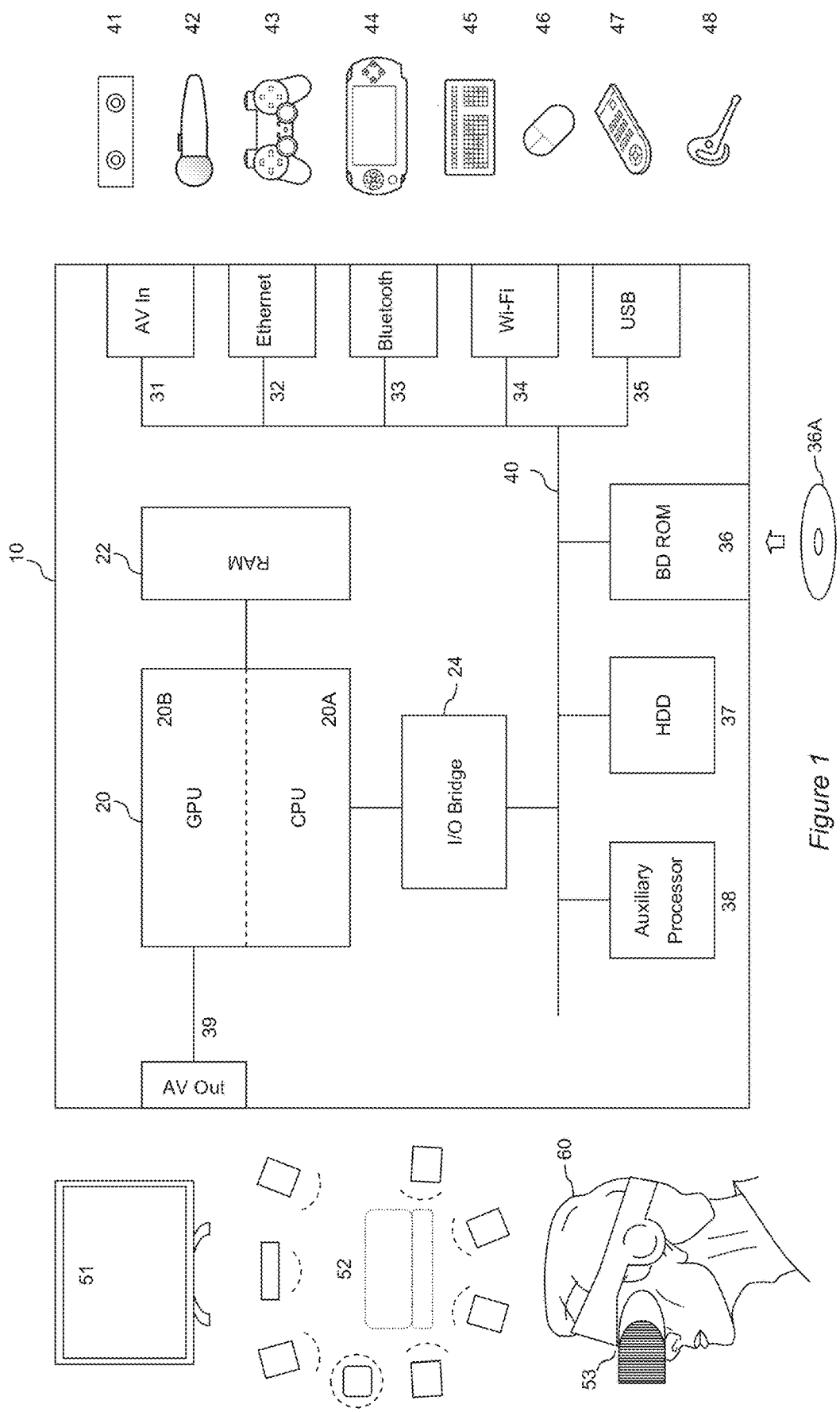
FIG. 1 is a schematic diagram of a data storage system in accordance with embodiments of the present disclosure.

An example of an entertainment device operating as a data storage system is the Sony PlayStation 4® or PlayStation 5®. Referring now to the drawings, wherein like reference numerals designate identical or corresponding parts throughout the several views, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a WiFi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 (HMD) worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

In an embodiment of the present invention, the entertainment device uses a graphics processing scheme referred to as delta colour compression, or 'DCC', for some or all of its graphics.

In this scheme, graphics textures are subdivided into tiles (for example 8×8, 16×16, 32×32, 64×64, 128×128 pixels, and so on). DCC adds metadata to a texture, so that in addition to the 2D array of colours for the texture itself there is metadata for one or more tiles (and typically but not necessarily all tiles) within the larger texture image.

The metadata is considerably smaller in terms of memory than the tile it relates to, but nevertheless is occupies and additional amount of memory.

DCC can be used for tiles where the colours are similar to each other (for example in the sky, or a plain wall); in this case, a base colour (e.g. an average colour for the tile) is stored in the DCC metadata, and only the differences with respect to this average colour are stored in the pixel data of the tile itself. Typically therefore these deltas are much smaller numbers and can be represented by fewer bits.

The metadata's primary purpose is thus to act as a means of bandwidth optimisation when reading from or writing to the texture.

The scheme can also be used for tiles of uniform colour, in which the deltas of the tile would effectively be zero. In this case the metadata can fully represent the tile's contents without reference to the tile pixels themselves.

Hence depending on the contents of the texture tile, the DCC metadata may be sufficient to entirely describe the tile's contents without referring to the texture data itself, and thus reading the tile's pixel may occur a much lower memory bandwidth cost. This is especially true where the texture has been cleared to one of the following colours:
1) Opaque white (1,1,1,1).
2) Opaque black (0,0,0,1).
3) Transparent white (1,1,1,0).
4) Transparent black (0,0,0,0).

More generally as noted above any uniform block of colour may be efficiently characterised in this way.

As illustrated by the pseudocode below, a DccMetadataCode enum can define values used to clear the DCC buffer to one of the four colours mentioned above. As noted, the examples below are non-exhaustive and any block colour can be defined.

enum class DccMetadataCode: uint8_t
{
....
   k0000=0x00, //!<Entire block is interpreted as <c>RGBA={0,0,0,0}</c>. Reads the metadata surface only.
   k0001=0x40, //!<Entire block is interpreted as <c>RGBA={0,0,0,1}</c>. Reads the metadata surface only.
   k1110=0x80, //!<Entire block is interpreted as <c>RGBA={1,1,1,0}</c>. Reads the metadata surface only.
   k1111=0xC0, //!<Entire block is interpreted as <c>RGBA={1,1,1,1}</c>. Reads the metadata surface only.
....
};

Notably, by using the DCC scheme, clearing a tile of a graphics frame buffer to a blank/uniform state entails only clearing the DCC metadata; the actual texture pixel contents are not relevant.

Similarly, reading a tile of a graphics frame buffer that is blank/uniform entails only reading the DCC metadata for that tile; again the actual texture pixel contents are not relevant.

This is the primary advantage of the DCC scheme; management of relevant tiles can be achieved with a fraction of the memory reads/writes that would be required to directly read or change pixel value data in the tile itself.

Thus during scanout of the framebuffer to form an image, the entertainment device can interpret the DCC values of such tiles to signify that an entire tile is a constant block colour, without reference to the pixel data itself. This significantly reduces the computational load of handling graphics per-frame.

In an embodiment of the present invention, however, it has been appreciated that where the DCC scheme is used such that the pixel value data of a tile of a texture is not directly referenced in graphics memory, then the memory allocated to the pixel values of that tile can be used for other data without any visual impact on graphical output.

Consequently, additional useful information relating to a graphics image can be included instead of the pixel data of such a tile, without incurring additional overhead. This has the direct advantage of freeing up memory that would otherwise be used to store the useful information elsewhere, and potentially of reducing the bandwidth for transmitting the image data as well as the useful information. It can also allow useful data to be passed through the graphics pipeline with little or no additional overhead or computational cost due to different data handling.

These benefits in turn effectively increases usable memory capacity and also effective bandwidth, for example allowing more image data frames to be transmitted to a head mounted display per second.

Non-limiting and non-exhaustive examples of the useful information that could be included in one or more tiles comprises, either singly or in combination:

i. Foveated rendering related information; in foveated rendering, more detail is displayed in a region of an image that is expected to be looked at by the fovea of the user's eye. Hence useful additional information includes the expected position of fovea gaze, and any rendering instructions for how the image is to be generated/rasterised as a function of this position.

ii. Flexible scale rasterization parameters; in flexible scale rasterization, the image is initially represented by bins, rather than pixels, where bins can have different sizes. This can allow the image to be represented by fewer bins than eventual pixels, for example by having a 1:1 relationship between bins and pixels at the image centre (or at the expected fovea position), but a 1:many relationship between bins and pixels at the image periphery (or further way from the expected fovea position). The bin to pixel relationship for one or more axes is typically defined by a curve (FSR distortion parameter) that can be included instead of pixel data in a tile that is effectively defined using DCC.

One of the key uses of FSR is for foveated rendering. A smaller render target can be used to reduce bandwidth and pixel work while keeping resolution the same as the original target in that part of the image where the user is looking. By way of example, if an original resolution is 4K, it may be useful to drop to an effective overall resolution of 1080p for performance reasons, while keeping the resolution where the user is looking at 4K. Because FSR effectively redistributes resolution the resolution in the centre can be increased by 2.0×to bring it up to 4K, and it will redistribute the remaining resolution in the periphery. This process results in a distorted target. In order to display this on a TV or HMD it must be undistorted back to the final resolution. Normally this is done as part of a post-process effect chain but it would be better to be done as late in processing sequence as possible, in order to keep the smaller buffer in the pipeline for as long as possible. If this distorted buffer could be passed directly to scanout for it to perform the undistortion step, then the application never has to incur the computational cost of the undistortion during other process steps.

In other words, this would allow a smaller FSR distorted frame buffer to be passed directly to video out hardware, and it would be resolved to the full-size, undistorted frame buffer as part of the scanout itself. This would represent a significant memory and bandwidth saving over resolving before passing to the scanout.

As noted previously, the FSR distortion is typically defined by a curve in each axis. These curves can be defined using look-up tables. Hence the undistortion process may use two lookup tables of dimension resolve_target_width×1 and resolve_target_height×1, since FSR is performed separately for horizontal and vertical directions. Hence these tables could be stored in the effectively vacant pixel memory of a tile being characterised by DCC to be used by the scanout.

iii. Alternative or additional graphics; optional graphical overlays or other graphical elements could replace the pixel data in a suitable tile, for access if needed; for example data for pixels of a column of graphical data to the left and right of the intended image could be included, to facilitate last moment shifting of the image to the left or right, for example in response to head motion detected by an HMD in the time between image transmission to the HMD and image display. Similarly, different or additional graphical overlays may be used for a scanout to a TV, an HMD, and/or a streaming service such as Twitch®, and these can be accessed at the scanout stage.

iv. HMD data such as updated head rotation, position and/or orientation data; this would allow such data to be passed to the scanout process so that so-called reprojection can be performed as part of the scanout, thereby reducing latency.

It will be appreciated therefore that using memory notionally comprising tile pixel data, for tiles that can be fully characterised by DCC metadata during scanout, enables additional data to be carried through the graphics pipeline, which in turn can directly reduce memory requirements and data bandwidth, but also allow graphics to remain in a more efficient form for further along the pipeline with no additional overhead, making other processes applied during the graphics pipeline more efficient. This in turn can reduce latency and increase framerate.

However, a potential issue is that it may be hard to predict which tiles in a given frame can be fully characterised by DCC metadata (e.g. because they are effectively uniform in colour); particularly in a videogame where the current viewpoint (and hence what is being shown) is driven by user inputs and in-game events. This may make it difficult or impossible to define or assume a reliable in-tile memory budget for the above useful information on a frame-by-frame basis, making it difficult to properly take advantage of the technique. Hence whilst the approach may be used opportunistically, it may be difficult to use as an assumed or consistent feature.

Accordingly, in an embodiment of the present invention, one or more tiles are selected that correspond to at least some of a graphical user interface (GUI) component of the image. Typically, a GUI of a game provides a consistent and static graphical element that conveys the status of various game aspects, such as player health or location, or current player configuration (equipped weapons, potions and the like). The GUI is typically static and changes little so that it is not distracting, and so the user can easily glance at relevant information that is presented in a consistent manner and at a consistent position.

Such a GUI may comprise, or may be specifically designed to comprise, one or more tiles that comprise a uniform block of colour and can be characterised using DCC metadata. This then allows the relevant tile or tiles to be used consistently for the storage of other useful data, as described previously herein.

Optionally the GUI may be designed to comprise enough such tiles to convey a particular data budget, using tiles of one or more sizes (depending on whether multiple tile sizes are supported). Hence for example to convey 12 kilobytes of data, a 64×64 tile with three 8-bit colour channels may be used. Alternatively, for example, to fit within a different design of GUI three 32×32 pixel tiles and four 16×16 tiles might equivalently be used. It will be appreciated that in an HD or Ultra HD image, such tiles can be relatively small within the GUI design and so have little visual impact.

In a variant embodiment, where a tile comprises non-zero deltas, a threshold may be applied (for example to the largest delta in the tile). If the largest delta is below this threshold, then the tile can be characterised instead as blank using the DCC metadata, and the tile values re-used for useful information.

In this case, the threshold is set sufficiently low that the visual impact of the deltas is considered acceptably small.

This allows for the techniques described herein to operate with limited visual impact (as set by the threshold) in the even that there is no graphical user interface, or the graphical user interface does not comprise sufficient uniform colour tiles to convey all the desired useful information.

It will be appreciated that optionally such a scheme could start with a small threshold, and slowly raise the threshold until enough tiles for the required useful data have been found.

Similarly optionally such a scheme may preferentially select tiles adjacent to or closest to already chosen tiles (for example tiles of a GUI, or tiles identified as uniform within the image), when more tiles than are needed meet the current threshold, so that the smoothing of the image colour occurs in one region rather than potentially creating blocks of flat colour in random places in the image. However, as noted previously herein, for HD or UHD images, a significant amount of useful data can be conveyed in relatively small tiles; as a result the visual impact of making a nearly uniform tile completely uniform is typically not noticeable.

Figure 2:
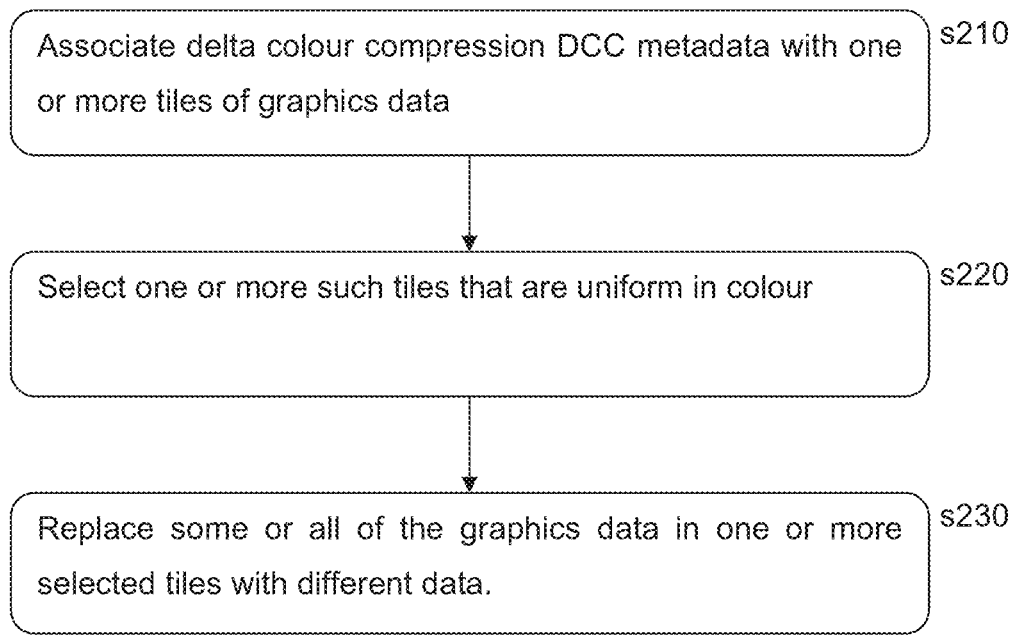
FIG. 2 is a flow diagram of a storage method in accordance with embodiments of the present disclosure.

Referring now to FIG. 2, in a summary embodiment of the present invention, a method of data storage comprises:

In a first step s210, associating delta colour compression DCC metadata with one or more tiles of graphics data. As described previously, the DCC metadata can enable the more efficient description of tiles by defining an average or representative base colour and using deltas within the tile itself—but where the tile is a uniform colour, reference to the tile data itself is not necessary and it can be characterised by the DCC metadata alone.

In a second step s220, selecting one or more such tiles that are uniform in colour and hence can be accurately represented by the DCC metadata for that tile. As described previously, optionally non-uniform tiles where the deltas are below a threshold value may also be used, with the DCC metadata then defining the tile as uniform.

In a third step s230, replacing some or all of the graphics data in one or more selected tiles with different data. As described previously herein, the different data can be alternative graphics data, or more typically non-graphics data used by other one or more other processes (for example related to foveated rendering, flexible scale rasterization, HMD control, or non-graphics processes).

Hence in short the different data can relate to one or more of data for image/graphics processes (e.g. data related to image processes such as FSR, foveated rendering, and the like), data for non-image/non-graphics processes (e.g. e.g. HMD control, or one or more other non-image/graphics process that may benefit from data storage within the buffer), and other graphical data (e.g. additional and/or alternative graphics data). In an instance of the summary embodiment, selected tiles belong to a graphical user interface element of an image frame. As described previously, these tend to be consistent from frame to frame, allowing an ongoing memory budget to be established for the different data.

In an instance of the summary embodiment, the different data comprises data related to foveated rendering of the image frame, as described previously herein.

In an instance of the summary embodiment, the different data comprises alternative or additional graphical data, as described previously herein.

In an instance of the summary embodiment, the different data comprises data relating to the operation of a head mounted display, as described previously herein. In this case, for example, the different data may comprise one or more selected from the list consisting of head rotation data, head position data, and head orientation data.

Finally, in an instance of the summary embodiment, the different data comprises data related to a flexible scale rasterization process, as described previously herein. In this case, for example, the different data may comprise data relating to the reversal of image distortion caused during the flexible scale rasterization process.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

As noted previously, a Sony PlayStation 4 ® or PlayStation 5 ® represent suitable conventional hardware for the data storage system.

Accordingly, in a summary embodiment of the present invention, a data storage system (such as an entertainment device 10 like the Sony PlayStation 4 ® or PlayStation 5®) comprises memory (such as RAM) 22 for storing delta colour compression DCC metadata in association with one or more tiles of graphics data; a selection processor (such as CPU 20A, GPU 20B or a combination thereof) adapted (for example by suitable software instruction) to select one or more such tiles that are uniform in colour and hence can be accurately represented by the DCC metadata for that tile; and an update processor (such as CPU 20A, GPU 20B or a combination thereof) adapted (for example by suitable software instruction) to replace some or all of the graphics data in one or more selected tiles with different data.

In an instance of this summary embodiment, the tiles selected by the selection processor belong to a graphical user interface element of an image frame, as described previously herein.

In an instance of this summary embodiment, the different data comprises data related to foveated rendering of the image frame, as described previously herein.

In an instance of this summary embodiment, the different data comprises alternative or additional graphical data, as described previously herein.

In an instance of this summary embodiment, the different data comprises data relating to the operation of a head mounted display, as described previously herein.

Finally, in an instance of this summary embodiment, the different data comprises data related to a flexible scale rasterization process, as described previously herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of data storage, comprising:
associating delta colour compression DCC metadata with one or more tiles of graphics data;
selecting one or more such tiles that are uniform in colour and hence can be accurately represented by the DCC metadata for that tile; and
replacing some or all of the graphics data in one or more selected tiles with different data, wherein the different data relates to one or more of:
i. additional or alternative graphics data;
ii. image processing; and
iii. one or more processes other than image processing.

2. The method of claim 1, in which: selected tiles belong to a graphical user interface element of an image frame.

3. The method of claim 1, in which: the different data comprises data related to foveated rendering of an image frame.

4. The method of claim 1, in which: the different data comprises data relating to an operation of a head mounted display.

5. The method of claim 4, in which the different data comprises one or more of:
i. head rotation data;
ii. head position data; and
iii. head orientation data.

6. The method of claim 1, in which: the different data comprises data related to a flexible scale rasterization process.

7. The method of claim 6, in which the different data comprises data relating to the reversal of image distortion caused during the flexible scale rasterization process.

8. A non-transitory, computer readable storage medium containing a computer program comprising computer executable instructions, which when executed by a computer system, cause the computer system to perform a method of data storage by carrying out actions, comprising:
  associating delta colour compression DCC metadata with one or more tiles of graphics data;
  selecting one or more such tiles that are uniform in colour and hence can be accurately represented by the DCC metadata for that tile; and
  replacing some or all of the graphics data in one or more selected tiles with different data, wherein the different data relates to one or more of:
  i. additional or alternative graphics data;
  ii. image processing; and
  iii. one or more processes other than image processing.

9. A data storage system, comprising:
  memory for storing delta colour compression DCC metadata in association with one or more tiles of graphics data;
  a selection processor adapted to select one or more such tiles that are uniform in colour and hence can be accurately represented by the DCC metadata for that tile; and
  an update processor adapted to replace some or all of the graphics data in one or more selected tiles with different data,
  wherein the different data relates to one or more of:
  i. additional or alternative graphics data;
  ii. image processing; and
  iii. one or more processes other than image processing.

10. The data storage system of claim 9, in which: the tiles selected by the selection processor belong to a graphical user interface element of an image frame.

11. The data storage system of claim 9, in which: the different data comprises data related to foveated rendering of the image frame.

12. The data storage system of claim 9, in which: the different data comprises data relating to the operation of a head mounted display.

13. The data storage system of claim 9, in which: the different data comprises data related to a flexible scale rasterization process.

* * * * *